United States Patent [19]

Iida et al.

[11] Patent Number: 5,126,996
[45] Date of Patent: Jun. 30, 1992

[54] OPTICAL INFORMATION RECORD CARRIER AND THE METHOD OF PRODUCING THE SAME

[75] Inventors: Tetsuya Iida; Takanobu Higuchi; Kunizo Ogoshi; Shinichi Yokozeki, all of Saitama, Japan

[73] Assignee: Pioneer Electronic Corporation, Tokyo, Japan

[21] Appl. No.: 382,371

[22] Filed: Jul. 20, 1989

[30] Foreign Application Priority Data

Nov. 8, 1988 [JP] Japan .................. 63-281823
Jan. 30, 1989 [JP] Japan .................. 1-20999

[51] Int. Cl.⁵ .............................. G11B 7/013
[52] U.S. Cl. .................. 369/283; 369/272; 369/286
[58] Field of Search ........ 369/272, 275.1, 283, 369/284, 285, 292, 13, 14, 44.11, 108, 286; 360/131, 135; 346/135.1; 430/4, 56, 57, 270, 271, 275

[56] References Cited

U.S. PATENT DOCUMENTS

| | | |
|---|---|---|
| 4,179,532 | 12/1979 | Soeding. |
| 4,219,704 | 8/1980 | Russell. |
| 4,515,877 | 5/1985 | Barzynski et al. ............ 430/330 X |
| 4,905,215 | 2/1990 | Hattori et al. ............ 369/13 X |
| 4,908,813 | 3/1990 | Ojima et al. ............ 369/44.11 X |
| 4,956,243 | 9/1990 | Miyake et al. ............ 428/694 |
| 4,965,166 | 10/1990 | Hosoi et al. ............ 430/151 X |
| 4,977,064 | 12/1990 | Sukawa et al. ............ 346/135.1 X |

FOREIGN PATENT DOCUMENTS

| | | |
|---|---|---|
| 861011229 | 8/1986 | European Pat. Off. . |
| 9062164 | 1/1989 | European Pat. Off. . |
| 57-18458 | 8/1983 | Japan . |
| 57-34738 | 9/1983 | Japan . |
| 61-74149 | 4/1986 | Japan .................. 369/283 |
| 63-81639 | 4/1988 | Japan .................. 369/272 |
| 62-53325 | 9/1988 | Japan . |
| 8805592 | 6/1987 | PCT Int'l Appl. . |
| 2017379 | 10/1979 | United Kingdom . |

*Primary Examiner*—Bentsu Ro
*Attorney, Agent, or Firm*—Sughrue, Mion, Zinn Macpeak & Seas

[57] ABSTRACT

An optical information record carrier (optical disk, conventionally) has multiple reflective surfaces, each carrying separate information and each readable by an optical beam directed from the same side of the record carrier. The top most reflective surface reflects light of a first waveband and passes light of a second waveband. The next top most reflective layer reflects light within at least part of the second waveband. The record carrier is formed by producing a first reflective layer having a first pit pattern in the surface of a transparent substrate, pressing said first subtrate/layer combination to a transparent stamper having a second pit pattern, with a radiation hardening liquid resin therebetween, irradiating the resin by applying radiation to said resin through said stamper, peeling off said stamper, applying a second reflective layer to said hardened resin surface opposite the surface in contact with said first reflective layer, and applying a protective layer to said second reflective layer.

13 Claims, 3 Drawing Sheets

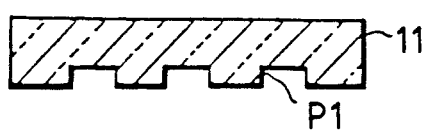
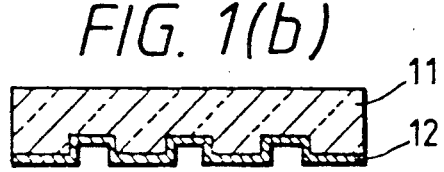
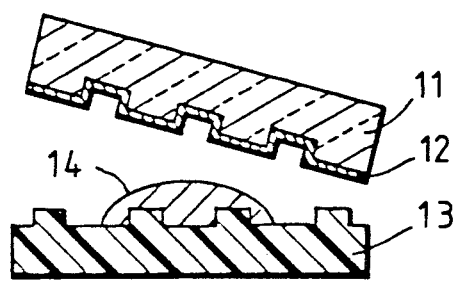
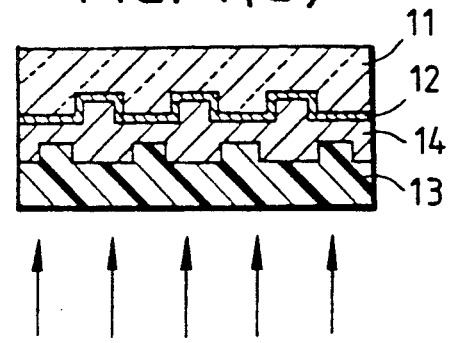
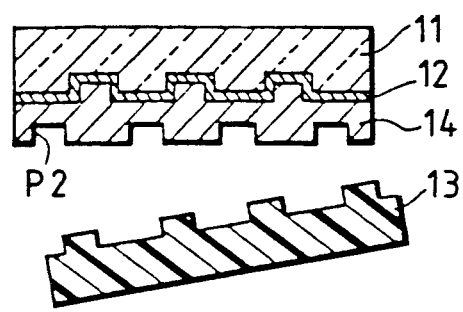
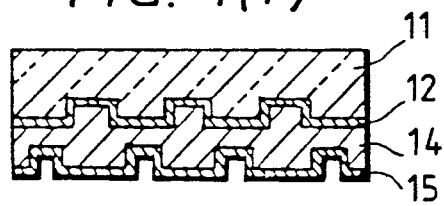

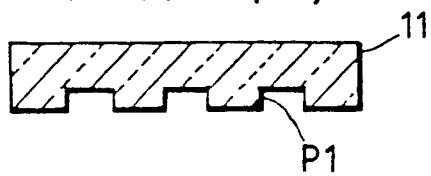
FIG. 2(a)
FIG. 2(b)
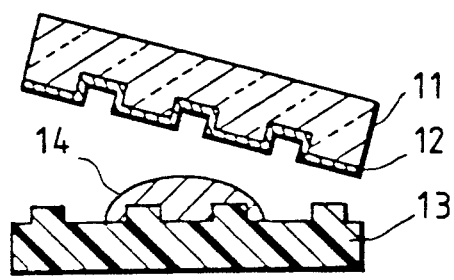
FIG. 2(c)
FIG. 2(d)
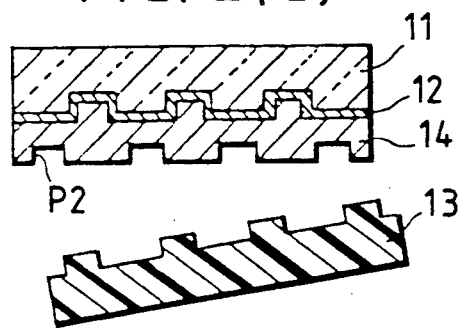
FIG. 2(e)
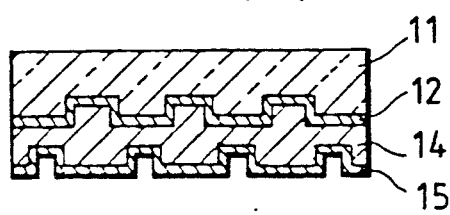
FIG. 2(f)
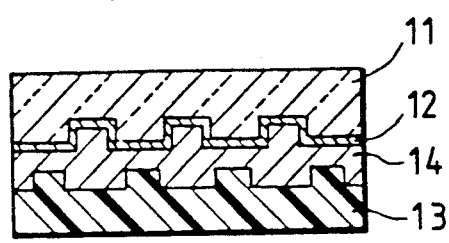

OPTICAL INFORMATION RECORD CARRIER AND THE METHOD OF PRODUCING THE SAME

BACKGROUND OF THE INVENTION

1. Technical Field

The present invention relates to optical disks, such as a video disk, a compact disk, etc., that carries information that can be read by optical means.

2. Prior Art

An optical disk of the type shown in FIGS. 3(a) to 3(c) is conventional. Such an optical disk has a structure in which metal is deposited on a transparent substrate 1 by evaporation or sputtering so as to form a metal reflecting layer 2, and a protecting layer 3 is formed on the reflecting layer 2. Fine recess and protrusion portions (hereinafter referred to as pits) corresponding to signals to be recorded are formed on the transparent substrate, and the reflecting layer 2 is made to have the same pit pattern. The transparent substrate 1 is made of a transparent resin material such as PMMA (polymethyl methacrylate), PC (polycarbonate), or the like, by a injection molding method, a compression molding method, a 2P method, or the like.

In a manufacturing process for the conventional disk, the material for the transparent substrate is injection molded using a stamper having the desired pit pattern. The desired pit pattern, arranged, spirally or concentrically is thus transferred to a main surface of the transparent substrate as shown at P in FIG. 3(a).

Next, as shown in FIG. 3(b), the metal reflecting layer 2 is formed on the surface of the transparent substrate 1 by an evaporation process. Finally, as shown in FIG. 3(c), the protecting layer 3, formed of a radiation setting resin capable of being hardened by radiation such as ultraviolet rays, is formed on the reflecting layer 2. Thus, the conventional optical disk is obtained.

Although a large quantity of conventional optical disks have been manufactured through an optical disk manufacturing process as described above, the conventional optical disks can not sufficiently satisfy the recent demand to form pits with higher density so as to make it possible to record larger quantities of information.

SUMMARY OF THE INVENTION

It is an object of the present invention to provide a high density optical information record carrier which has a relatively simple structure and which is suitable for mass production through a simple process and to provide a method of producing such a high-density optical information record carrier.

The optical information record carrier according to the present invention is characterized in that a plurality of reflecting layers respectively having reflection-light bands different from each other are laminated together.

The method of producing an optical information record carrier according to the present invention is characterized in that the method comprises the steps of:

forming a first reflecting layer on a transparent substrate;

holding a transparent stamper having radiation transmitting property on the first reflecting layer through liquid radiation setting resin;

irradiating the radiation setting resin with radiation from the transparent stamper side;

peeling the transparent stamper from the radiation setting resin layer after the radiation setting resin has hardened;

forming a second reflecting layer on the hardened radioactive-setting resin layer; and laminating a protecting layer on the second reflecting layer for protecting the second reflecting layer.

The transparent stamper according to the present invention is characterized in that it is made of glass or plastic having a radiation transmitting property.

Another optical information recording carrier according to the present invention is characterized in that a plurality of reflecting layers different in reflection-light band from each other are laminated one on one through transparent layers.

The optical information record carrier producing method is characterized in that the method comprises the steps of: forming a first reflecting layer on a transparent substrate; holding a transparent stamper of radiation transmitting property on the first reflecting layer through liquid radiation setting resin; irradiating the radiation setting resin with radiation from the transparent stamper side to thereby harden the radiation setting resin so as to form a transparent layer; peeling the transparent stamper from the transparent layer; forming a second reflecting layer on the transparent layer; and laminating a protecting layer on the second reflecting layer for protecting the reflecting layer.

The transparent stamper according to the present invention is characterized in that it is made of glass or plastic having radiation transmitting property.

Another method of producing an optical information record carrier according to the present invention is characterized in that the method comprises the steps of: forming a first reflecting layer having a first reflection light band on a transparent substrate; holding a stamper on the first reflecting layer through liquid radiation setting resin; irradiating the radiation setting resin with radiation through the first reflecting layer to thereby harden the radiation setting resin so as to form a transparent layer; peeling the stamper from the transparent layer; and forming a second reflecting layer having a second reflection light band which is different from the first reflection light band.

BRIEF DESCRIPTION OF THE DRAWINGS

FIGS. 1(a) to 1(g) are sectional views of an optical information record carrier showing a method according to the present invention of producing an optical information record carrier;

FIGS. 2(a) to 2(f) are sectional views of an optical information record carrier showing a method according to a second embodiment of the invention for producing an optical information record carrier.

DETAILED DESCRIPTION OF THE PREFERRED EMBODIMENT

Figure 3A:
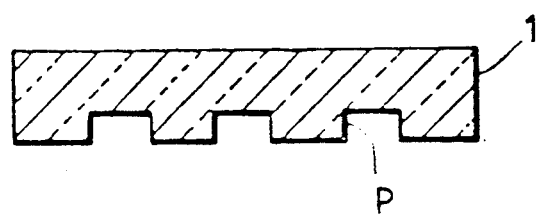
FIGS. 3(a) to 3(c) are sectional views showing a method of producing a conventional optical information record carrier.
Figure 3B:
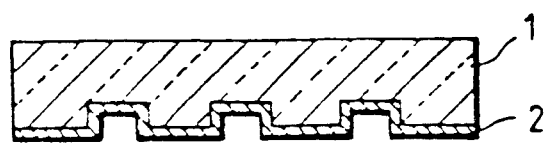
Figure 3C:
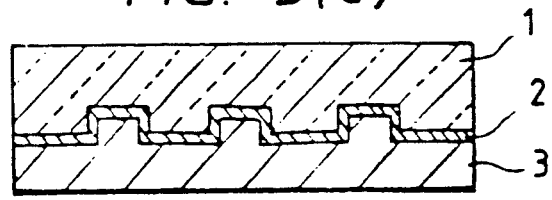

As shown in FIG. 1(a), a transparent substrate 11 carrying first recording pits P1 is prepared. The transparent substrate 11 is formed conventionally by injection molding a transparent resin, such as PMMA, PC, or the like, using a nickel stamper (not shown) on the surface of which pits P1 are arranged spirally or concentrically. As a result, the pit pattern of the nickel stamper is transferred onto the transparent substrate 11 as the first pits P1.

Next, as shown in FIG. 1(b), silicon (Si) is evaporated onto the surface of the substrate 11 carrying the pits P1 by use of a vacuum evaporation apparatus so as to form a reflecting layer 12. Thus, the first reflecting layer 12 of silicon is formed on the transparent substrate 11.

Then, a transparent stamper 13 is prepared by conventional methods and mounted on a conventional transfer apparatus. The transparent stamper 13 is made of glass or plastic having a radiation transmitting property so as to be able to transmit light in a wavelength band necessary to harden a radiation setting resin 14 which is to be applied in the following step. The transparent stamper 13 has second recording pits P2 arranged spirally or concentrically on the surface thereof. The transparent stamper 13 is mounted on the transfer apparatus with the pit surface facing upward as shown in FIG. 1(c).

Next, as shown in FIG. 1(c), a liquid radiation setting resin 14 is fed onto the pit surface of the transparent stamper 13. The transparent substrate 11 is then placed on the pit surface of the transparent stamper 13 through the liquid radiation setting resin 14 with the first reflecting layer 12 of the transparent substrate 11 facing downward. As a result, the radiation setting resin 14 will be held between the first reflecting layer 12 and the transparent stamper 13 (FIG. 1(d)).

While in the state shown in FIG. 1(d), the first reflecting layer 12 is irradiated with radiation from the transparent stamper 13 side, that is, from the underside in the drawing, so as to harden the radiation setting resin 14. As a result, the hardened resin will conform its lower side to the pattern of second pits P2.

After the radiation setting resin has been hardened, the transparent stamper 13 is peeled off from the layer of the radiation setting resin 14, as shown in FIG. 1(e).

Thereafter, as shown in FIG. 1(f), aluminum (Al) is evaporated onto the pits P2 carrying surface of the radiation setting resin 14 to thereby form a reflecting layer 15. Thus, the second reflecting layer 15 of aluminum is formed so as to be laminated on the radiation setting resin 14.

Finally, as shown in FIG. 1(g), a protecting layer 16 of a radiation setting resin is laminated onto the second reflecting layer 15 in order to protect the second reflecting layer 15, thereby obtaining an optical disk having a lamination of first and second reflecting layers 12 and 15 which differ from one another in their respective reflection light bands.

By selecting the materials of the two reflecting layers to have different reflection light bands, the two pit patterns may be read separately by optical beams of different wavelength. For example, light which will reflect from one of the reflecting layers will pass through the other reflecting layer.

In the specific embodiment disclosed above, the first reflecting layer 12 is made of silicon. A light beam of 400 nm wavelength directed from the top of the laminated layer will be reflected by the layer 12, and thereby will carry the information of pit pattern P1. The second reflecting layer of the above embodiment is aluminum. A light beam of not less than 800 nm wavelength directed from the top of the laminated layers will pass through the first reflecting layer 12 and be reflected by the second reflecting layer 15, and thereby will carry the information of pit pattern P2.

Thus, by use of different materials for forming the reflecting layers, the reflecting layers are made to be different in reflection light band from each other. Further, by adjusting the thickness of the first and second reflecting layers 12 and 15 in the evaporation step or in the sputtering step, it is possible to make the layers different from each other in light transmitting property.

Further, the steps shown in FIGS. 1(a) to 1(f) may be repeated by use of reflecting-layer materials which are different in reflection light band from each other, so that an optical disk having two or more reflecting layers can be obtained.

A second embodiment of the invention is shown in FIGS. 2(a) to 2(f). First, as shown in FIG. 2(a), a transparent substrate 11 carrying first recording pits P1 is prepared. The transparent substrate 11 is the same as that in the first embodiment.

Next, a dielectric multi-layer reflecting layer is formed on the surface of the substrate 11. As shown in FIG. 2(b), a first reflecting layer 12 having a first reflection light band is formed on the transparent substrate 11. The first reflecting layer is a dielectric multi-layer reflecting layer which reflects light of 800 nm while allowing light of other wavelengths, for example, not more than 600 nm, to pass therethrough.

A stamper 13 having second recording pits arranged spirally or concentrically on the surface thereof is mounted on a transfer apparatus with the pit surface facing upward as shown in FIG. 2(c).

As shown in FIG. 2(c), a liquid radiation setting resin 14 is applied to the pit surface of the stamper 13.

The transparent substrate 11 is then mounted on the pit surface of the stamper 13 through the liquid radiation setting resin 14 with the first reflecting layer 12 of the transparent substrate 11 facing downward. Thus, the radiation setting resin 14 is held between the first reflecting layer 12 and the stamper 13 (FIG. 2(d)).

While held in the state shown in FIG. 2(d), the first reflecting layer 12 is irradiated with radiation from the transparent substrate 11 side, that is, from the upper side in the drawing, so as to harden the radiation setting resin 14 to thereby form a transparent layer. Thus, the pits arranged on the stamper 13 are transferred as second pits P2 onto the transparent layer 14 of the hardened radiation setting resin.

As shown in FIG. 2(e), after the radiation setting resin has been hardened, the stamper 13 is peeled off from the transparent layer 14 of the radiation setting resin.

As shown in FIG. 2(f), a dielectric multi-layer reflecting layer 15 is formed on the pits P2 carrying surface of the radiation setting resin 14 by use of the vacuum evaporation apparatus. Thus, the second reflecting layer 15 having a second reflection light band is formed as a lamination on the radiation setting resin 14. The second reflecting layer is a dielectric multi-layer reflecting layer which reflects laser light having a wavelength different from that of the first reflecting layer and allows light having the other wavelength to transmit therethrough.

The steps of FIGS. 2(c) to 2(f) may be repeated, thereby obtaining an optical disk having more than two reflecting layers. A protecting layer 16 of radiation setting resin is laminated on the last reflecting layer in order to protect the last reflecting layer, thereby obtaining an optical disk having laminations of multiple reflecting layers which are different from each other in reflection light band.

By suitably selecting wavelengths reflected on respective reflecting layers, it is possible to laminate a number of reflecting layers and transparent layers.

It is possible to make the dielectric multi-layer reflecting layer have a narrow reflection light band by alternately laminating λ/4 films of a high-refractive-index material such as PbO₂, ZrO₂, TiO₂, or the like and a low-refractive-index material such as SiO₂, MgF₂, Al₂O₃, or the like. Further, it is possible to make the reflection light selectivity high by suitably shifting the film thicknesses of the respective films of the reflecting layer or by combining two or three reflection light bands on the same plane.

In this embodiment, light having a wavelength, for example, 800 nm, sufficiently reflected by the first reflecting layer is used when the pits P1 on the first reflecting layer are read, while light having a wavelength, for example, 500 nm, which can be transmitted through the first reflecting layer and can be reflected by the second reflecting layer is used when the pits P2 on the second reflecting layer are read. Thus, the second embodiment of the optical disk having a structure in which the reflecting layers differ from each other in reflection light band are laminated one on one, is characterized in that it is made possible to produce the foregoing optical disk by means of an ordinary non transparent stamper by using, as a reflecting layer, a dielectric layer which can sufficiently transmit radiation having a wavelength band in which a radiation setting resin can be hardened.

As described above, according to the present invention, since a plurality of the reflection layers which differ in their respective reflection light bands from each other are laminated, it is possible to obtain an optical information record carrier which is improved in recording density.

Further, according to the present invention, a transparent stamper having radiation transmitting property is used and radiation setting resin is irradiated with radiation from the transparent stamper side so as to harden the radiation setting resin. Accordingly, it is possible to obtain an optical information record carrier having a plurality of reflecting layers which are laminated, that is, it is possible to make an optical information record carrier have a large capacity.

It will be apparent to those of ordinary skill in the art that the teachings herein can be used to provide an optical information record carrier having multiple reflective surfaces that can be read by optical beams directed from the same side of the record carrier, and that the invention is not limited to either the specific materials described above or the specific number of reflective layers described above.

What is claimed is:

1. An optical information record carrier of the type which is read by directing an optical beam towards one surface thereof, the improvement comprising:
   a plurality of reflective layers of differing optical reflective properties laminated together;
   each of said plurality of reflective layers containing a pattern of information thereon readable by an optical beam;
   the first one of said reflective layers closest to said one surface having the characteristic of being transmissive to an optical wavelength to which another of said reflective layers is reflective, wherein said first reflective layer is silicon, and said another reflective layer is aluminum.

2. An optical information record carrier according to claim 1, wherein the laminated structure including said reflective layers comprises in the following order from said one surface, a transparent substrate, said first reflective layer, a radiation hardened resin, said second reflective layer, and a protective layer.

3. An optical information record carrier according to claim 1, wherein said reflective layers are multi-layered dielectric reflecting layers having a narrow reflection light band.

4. An optical information record carrier according to claim 1, wherein each of said reflective layers has a pit pattern representing information thereon.

5. An optical information record carrier of the type which is read by directing an optical beam towards one surface thereof, the improvement comprising:
   a plurality of reflective layers of differing optical reflective properties laminated together;
   each of said plurality of reflective layers containing a pattern of information thereon readable by an optical beam;
   the first one of said reflective layers closest to said one surface having the characteristic of being transmissive to an optical wavelength to which another of said reflective layers is reflective wherein said first reflective layer is silicon and said another reflective layer is aluminum.

6. An optical information record carrier according to claim 5, wherein the laminated structure including said reflective layers comprises in the following order from said one surface, a transparent substrate, said first reflective layer, a radiation hardened resin, said another reflective layer, and a protective layer.

7. An optical information record carrier comprising a plurality of reflecting layers respectively having reflection light bands different from each other laminated to one another wherein at least one of said plurality of reflecting layers comprises a two-reflecting-layer structure in which one layer of said two-reflecting-layer structure is made of silicon and the other layer is made of aluminum.

8. An optical information record carrier according to claim 7, wherein each of said plurality of reflecting layers has fine recesses and protrusions.

9. An optical information record carrier according to claim 7, further comprising a plurality of transparent layers, one each interposed between adjacent ones of said reflecting layers.

10. An optical information record carrier according to claim 9, wherein said transparent layers comprise radiation setting resin, and said reflecting layers allow radiation for hardening said radiation setting resin to pass therethrough.

11. An optical information record carrier according to claim 10, wherein said reflecting layers comprise dielectric multi-layer films.

12. An optical information record carrier according to claim 9, wherein each of said transparent layers has fine recesses and protrusions.

13. An optical information record carrier of the type which is ready by directing optical beams towards one surface thereof, the improvement comprising:
   a plurality of reflective layers of differing optical reflective properties laminated together;
   each of said plurality of reflective layers containing a pattern of information thereon separately readable by optical beams of different wavelengths;
   the first one of said reflective layers closest to said one surface having the characteristics of being transmissive to a wavelength to which another of said reflective layers is reflective wherein said first reflective layer is silicon and said another reflective layer is aluminum.

* * * * *